(12) United States Patent
Tomanik et al.

(10) Patent No.: US 8,157,268 B2
(45) Date of Patent: Apr. 17, 2012

(54) PISTON FOR INTERNAL COMBUSTION ENGINES

(75) Inventors: Antonio Eduardo Meirelles Tomanik, Sao Paulo SP (BR); Mauricio Ciminelli Duarte de Souza, Itajuba MG (BR)

(73) Assignees: MAHLE International GmbH, Stuttgart (DE); MAHLE Metal Leve S/A, Sao Paulo SP (BR)

( * ) Notice: Subject to any disclaimer, the term of this patent is extended or adjusted under 35 U.S.C. 154(b) by 344 days.

(21) Appl. No.: 12/448,023

(22) PCT Filed: Nov. 29, 2007

(86) PCT No.: PCT/IB2007/003887
§ 371 (c)(1),
(2), (4) Date: Sep. 1, 2009

(87) PCT Pub. No.: WO2008/068613
PCT Pub. Date: Jun. 12, 2008

(65) Prior Publication Data
US 2010/0090416 A1    Apr. 15, 2010

(30) Foreign Application Priority Data
Dec. 5, 2006 (BR) ..................... 0605175

(51) Int. Cl.
B60T 11/236 (2006.01)
F02F 5/00 (2006.01)
F16J 9/00 (2006.01)
F16J 9/14 (2006.01)

(52) U.S. Cl. ....................... 277/434; 277/496

(58) Field of Classification Search ............. 277/493, 277/496–499, 447, 434
See application file for complete search history.

(56) References Cited

U.S. PATENT DOCUMENTS

| 1,658,440 | A | * | 2/1928 | Hanigan | 277/459 |
| 2,591,920 | A | * | 4/1952 | Colvin | 277/434 |
| 3,918,211 | A | * | 11/1975 | Packard | 451/320 |
| 5,380,018 | A |   | 1/1995 | Mader et al. | |
| 5,673,923 | A | * | 10/1997 | Watanabe et al. | 277/500 |

(Continued)

FOREIGN PATENT DOCUMENTS

DE    43 10 249    12/1994

(Continued)

OTHER PUBLICATIONS

Mierbach, A. et al., "Heat Flow Through Piston Rings and Its Influence on Shape," 1983, SAE Technical Paper Series, SAE paper 831283, pp. 25-37. (Spec, p. 7).

(Continued)

Primary Examiner — Thomas Beach
Assistant Examiner — Nicholas L Foster
(74) Attorney, Agent, or Firm — Collard & Roe, P.C.

(57) ABSTRACT

The present invention relates to a piston ring (10), particularly a compression ring, for an internal combustion engine, comprising a ring-shaped body (11) having a ring joint (13) formed by butt ends (14a, 14b), the ring-shaped body (11) further having a ring contact face (12) along its perimeter, for contacting a cylinder wall in operation. According to the invention, the ring contact face (12) has a barrel-shaped profile, the barrel-shaped profile having in any of its cross-sections an area of maximum curvature, whose radius of curvature increases in the direction of the butt ends (14a, 14b).

5 Claims, 3 Drawing Sheets

U.S. PATENT DOCUMENTS

| | | | |
|---|---|---|---|
| 6,715,767 B1 * | 4/2004 | Meernik et al. | 277/459 |
| 7,052,019 B2 * | 5/2006 | Miida | 277/443 |
| 7,207,571 B2 * | 4/2007 | Yoshida et al. | 277/434 |
| 7,494,129 B2 * | 2/2009 | Breuer et al. | 277/466 |
| 7,997,584 B2 * | 8/2011 | Gallas et al. | 277/460 |
| 2002/0041071 A1 | 4/2002 | Mittler et al. | |
| 2004/0056425 A1 * | 3/2004 | Miida | 277/459 |
| 2010/0162987 A1 * | 7/2010 | Ishida | 123/193.6 |

FOREIGN PATENT DOCUMENTS

| | | |
|---|---|---|
| EP | 0 253 069 | 1/1988 |
| EP | 0 545 094 | 6/1993 |
| EP | 1 359 351 | 11/2003 |
| FR | 2 579 675 | 10/1986 |
| JP | 2000-120866 | 4/2000 |
| JP | 2001-263488 | 9/2001 |

OTHER PUBLICATIONS

Ma, J. et al., "The Piston Ring Shape and Its Effects on Engine Performance," 1996, Society of Automotive Engineers, Inc., SAE paper 960052, pp. 31-43. (Spec, p. 7).

Tomanik, E. et al., "Piston Ring Pack and Cylinder Wear Modelling," 2001, SAE paper 2001-01-0572, pp. 1-11. (Spec, p. 7).

Tomanik, E. et al., "Use of a Micro-contact Model to Optimize SI Engine's 3-piece Oil Ring Profiles Regarding Wear and Lubrication," ASME-ICE Fall Technical Conference, Sep. 2002, New Orleans, vol. 39, pp. 427-435. (Spec, p. 7).

Inter-Tech Energy Progress, Inc., "A Method to Improve Durability of Piston Rings in a Modern Diesel Engine," Engine Technology Progress in Japan: Compression-Ignition Engine Technology, Apr. 2001, 22001045, pp. 1-17.

International Search Report.

* cited by examiner

Figure 4
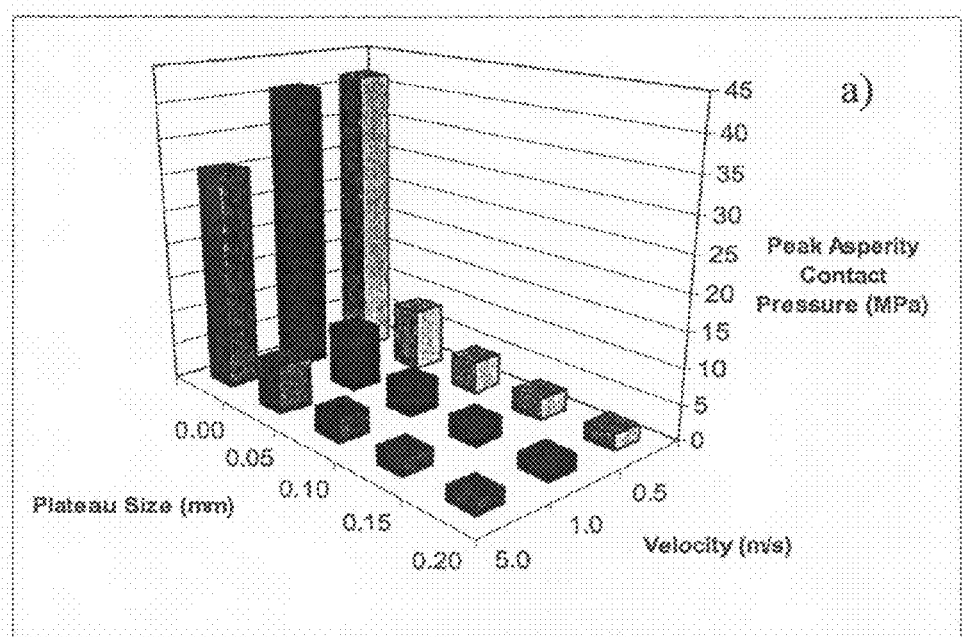
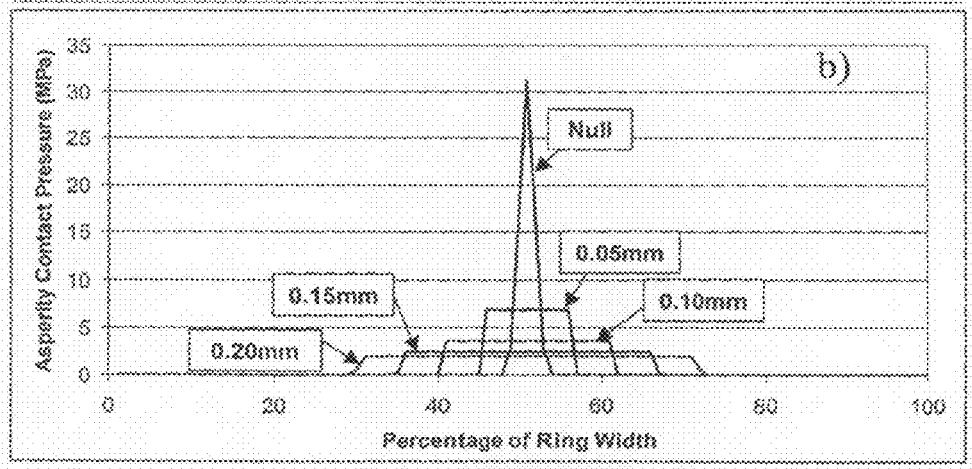
Figure 5

PISTON FOR INTERNAL COMBUSTION ENGINES

FIELD OF INVENTION

The present invention refers to a piston ring for an internal combustion engine and, more particularly, to a compression piston ring, comprising a ring-shaped body having a ring joint formed by butt ends.

BACKGROUND ART

In internal combustion engines, the piston ring shows a barrel profile on its contact face against a cylinder wall of the combustion engine. The barrel profile may be symmetrical or more commonly asymmetrical. If asymmetrical, the highest point of the profile exhibiting a maximum curvature is slightly displaced to the ring lower flank.

In operation of the combustion engine, the ring profile changes due to wear, assuming a slightly conical shape. The worn profile has strong influence on oil scraping and the contact pressure distribution, and consequently on the ring wear rate.

Due to the engine operating conditions, the temperature on the ring inside diameter is greater than on the outside diameter. Such thermal gradient causes a different expansion on the ring, being greater on the outside diameter than on the inside diameter. As a result of this different expansion, the butt end regions apply much more pressure against the cylinder wall than the other ring region, causing a greater wear on these butt end regions, even an early failure due to overpressure.

As a consequence of the greater wear rate, the hard layer usually applied on the ring contact face may be completely worn out at the butt end regions, causing a shortening of the edge live of the piston ring (References [1] to [3]).

In order to solve such localized wear problems, several solutions based on two main concepts are known:

1) A different free shape of the piston ring, so as to compensate in part for the deformations which occur during its operation and which cause the higher wear at the butt ends.

Patent document EP 0 545 094 A1 discloses a self-tensioning piston ring showing an uneven radial pressure distribution in such a way that the pressure maximum is located to the regions on the right and the left side of the butt ends and that the radial pressure at the ring joint drops down to zero.

Similar solutions are disclosed in patent documents JP 2001-263488 A and DE 43 10 249 C1.

2) A thinner cross-section at the area next to the butt ends, so that even with the deformations that arise during operation, a better accommodation of the butt end areas to the cylinder can occur. The cross-section is reduced in such areas next to the butt ends, no matter whether radially or crosswise, making those regions more flexible. These more flexible regions transmit less pressure to the cylinder wall, thus minimizing wear on the piston ring itself.

Patent document EP 0 253 069 A1 discloses a self-tensioning piston ring for high-speed machines, which is provided with a sharp edge at the underside of each butt end region. Each sharp edge turns into a bevel which extends over a certain length of the perimeter of the piston ring.

Patent document US 2002/0041071 A1 discloses a compression piston ring which includes a ring joint whose gap is defined by first and second end faces. A ring back is situated diametrically opposite to the ring joint. In comparison to the ring back, the region of the first and second end face is reduced exclusively.

A similar solution is disclosed in patent document JP 2000-120866 A.

In addition, it is also known that increasing the width of the ring contact face which effectively contacts the cylinder wall reduces the contact pressure and consequently the wear rate as well (References [4] and [5]).

OBJECT OF THE INVENTION

The object of the present invention is to provide a piston ring for internal combustion engines which shows reduced localized wear at the butt end regions, thus increasing its edge life and minimizing the risk of a failure due to overpressure at the butt end regions.

SUMMARY OF THE INVENTION

The object of the invention is achieved by a piston ring for internal combustion engines whose ring contact face has a barrel-shaped profile, said barrel-shaped profile having in any of its cross-sections an area of maximum curvature, whose radius of curvature increases in the direction of the butt ends. The piston ring according to the invention thus shows a ring contact face with a radius of curvature that differentiates along the ring perimeter. At each cross-section, the barrel-shaped profile shows a curvature which reaches a maximum at a certain point. The circle of curvature at this point has a radius of curvature, which increases when approaching the butt ends.

The ring contact face of the piston ring according to the invention therefore has two regions, starting from each butt end, which have a different shape compared with the remaining ring contact face. Thus, with regard to the cross-section of the ring contact face, its profile becomes less barreled in direction of the butt ends, i.e. its curvature becomes more flat (or less domed) when approaching the butt ends, said butt ends being regions where usually a higher wear occurs. Consequently, over the butt end regions the ring contact face shows a larger contact area with regard to the cylinder wall, thus reducing the effective contact pressure and consequently the wear of the ring contact face during operation of the engine.

Therefore, in this differentiated region of the barrel-shaped profile of the ring contact face, a better seating contact distribution occurs between the ring contact face and the adjacent wall of the engine cylinder, resulting in a minimization of wear and an increase of the edge life of the piston ring according to the invention and an increase of the engine service life as well.

The transition between the profile at the butt ends and at the remaining ring contact face is preferably made gradually and is especially extended over an angle of 0° to 90°, preferably 0° to 30° on the ring contact face, with regard to the ring joint. The barrel-shaped profile of the ring contact face is preferably manufactured by a grinding or lapping process.

BRIEF DESCRIPTION OF DRAWINGS AND PREFERRED EMBODIMENTS

The invention will be described as follows, making reference to the attached drawings, in which:

FIG. 4 shows the maximum asperity contact pressure as function of the effective area of contact and velocity.

FIG. 5 shows the asperity contact pressure along the profile of the ring contact face for different plateau sizes.

DETAILED DESCRIPTION OF THE INVENTION

Figure 1:
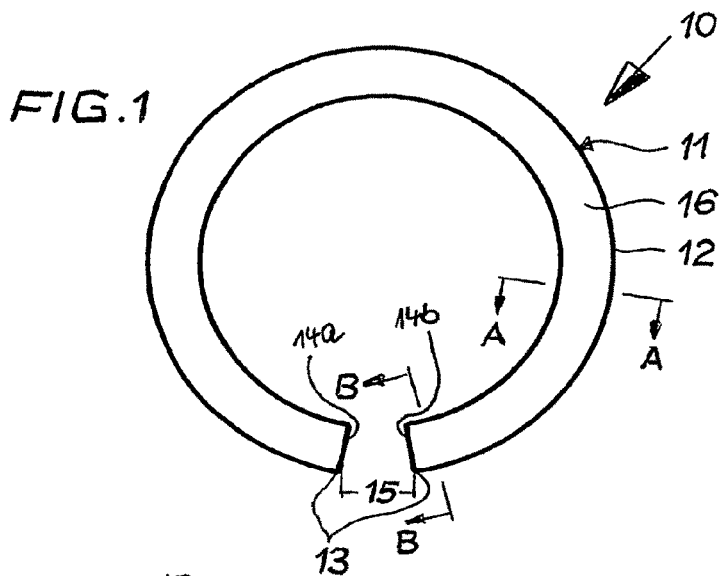
FIG. 1 represents a schematic view of an embodiment of a piston ring according to the invention.

FIG. 1 represents a schematic view of an embodiment of a piston ring 10 according to the invention. The piston ring 10 comprises a ring body 11 with an upper side face 16, a lower side face 17 and an outer ring contact face 12 to contact a cylinder wall during operation of the engine (not shown). The piston ring 10 further comprises a ring joint 13 with two butt ends 14a, 14b facing each other and defining a ring gap 15.

Figure 2A:
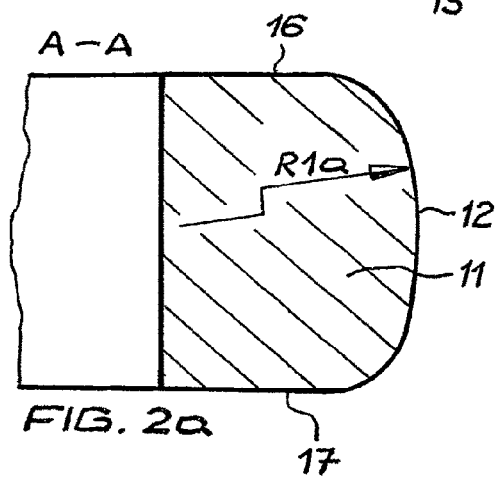
FIGS. 2a, 2b represent schematic cross-sectional views of symmetric (FIG. 2a) and asymmetric (FIG. 2b) barrel-shaped ring contact faces at a position A-A along the piston ring perimeter at a distance from the butt ends.
Figure 2B:
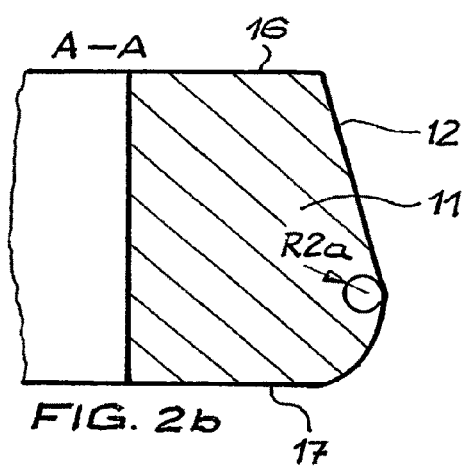

FIGS. 2a, 2b depict schematic cross-sectional views of symmetric (FIG. 2a) and asymmetric (FIG. 2b) barrel-shaped ring contact faces 12 at a position A-A along the piston ring perimeter. FIG. 2b shows that in case of an asymmetric barrel-shaped ring contact face 12 the highest point of the profile exhibiting a maximum curvature is slightly displaced to the lower side face 17 of the piston ring body 11.

Figure 3A:
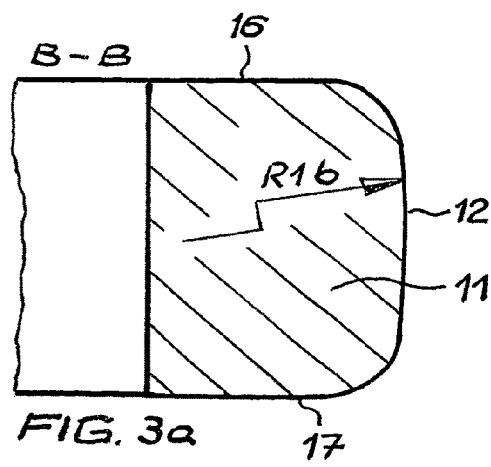
FIGS. 3a and 3b represent schematic cross-sectional views of symmetric (FIG. 3a) and asymmetric (FIG. 3b) barrel-shaped ring contact faces at a position B-B along the piston ring perimeter close to the butt ends.
Figure 3B:
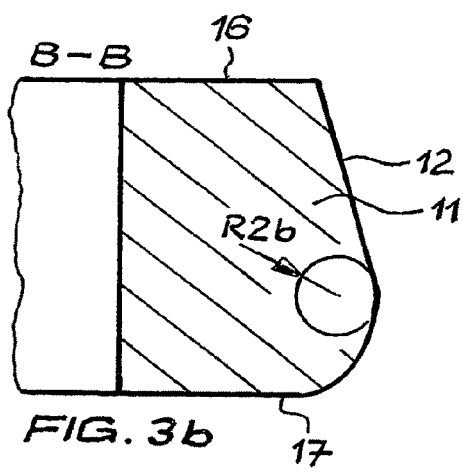

FIGS. 3a, 3b depict schematic cross-sectional views of symmetric (FIG. 3a) and asymmetric (FIG. 3b) barrel-shaped ring contact faces 12 at a position B-B along the piston ring perimeter. FIG. 3b shows that in case of an asymmetric barrel-shaped ring contact face 12 the highest point of the profile exhibiting a maximum curvature is slightly displaced to the lower side face 17 of the piston ring body 11.

FIGS. 2a and 2b and FIGS. 3a and 3b, respectively, show different cross-sections of the ring contact face 12, located at different positions along the ring perimeter. The position of the cross-section A-A is located at a distance from the butt ends 14a, 14b. In the present embodiment the cross-section A-A is located at an angle of approximately 90° starting at the ring joint 13. The position of the cross-section B-B is located close to the butt ends 14a, 14b.

FIGS. 2a and 2b and FIGS. 3a and 3b show that the barrel-shaped profile exhibits a curvature which reaches a maximum at a certain point of the profile. At this point, a circle of curvature can be defined, which has a certain radius of curvature. At the location of the cross-section A-A, the radii of curvature R1a (FIG. 2a) and R2a (FIG. 2b), respectively, are smaller than the radii of curvature R1b (FIG. 3a) and R2b (FIG. 3b) at the location of the cross-section B-B. This means that the radii of curvature at each cross-section between the angle of 90° and the angle of 0° increase gradually in the direction of the butt ends 14a, 14b. In other words: The radius R1a is smaller than the radius R1b in case of a symmetrically shaped profile and the radius R2a is smaller than the radius R2b in case of an asymmetrically shaped profile.

As a result, in the beginning of its life in the engine, the piston ring according to the invention already has a larger contact area in the regions of the butt ends 14a, 14b, ending up in a more distributed and therefore lower contact pressure, hence reducing the wear at the regions of the butt ends 14a, 14b.

Figure 6:
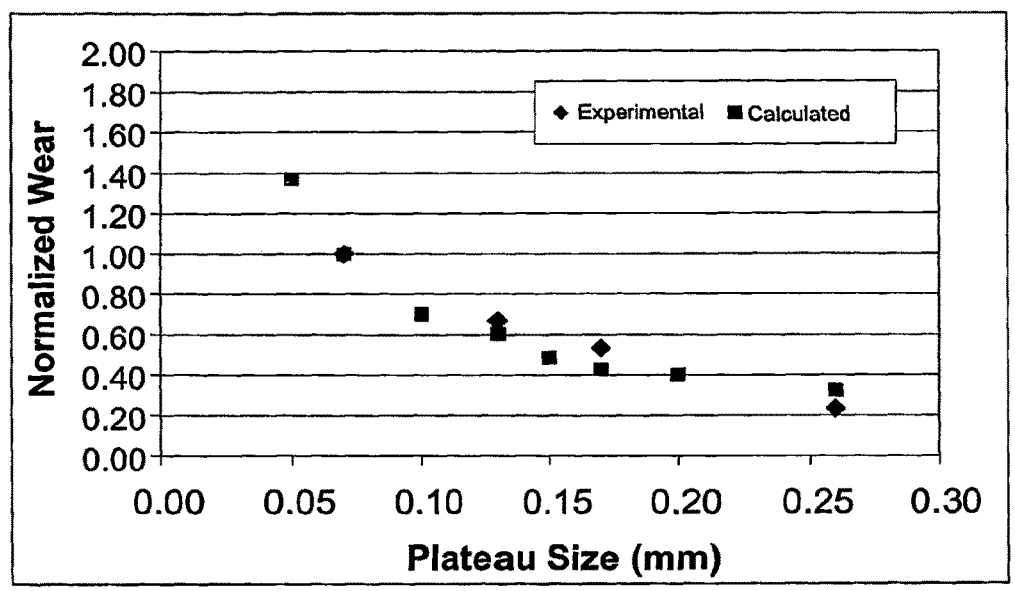
FIG. 6 shows a plot of normalized wear (experimental and simulation values).

Numerical computer simulations and engine tests were carried out with oil control piston rings having ring contact faces with different contact areas ("plateau size" in FIGS. 4 to 6 and the cited references). In the cited references, the contact area is constant along the piston ring perimeter, but the results exemplify the object of the invention.

FIG. 4 shows the maximum asperity contact pressure between a piston ring according to the invention and a cylinder wall for different speeds and ring contact areas ("plateau size"). With the increase of the ring contact area, the maximum of the asperity contact pressure decreases significantly.

FIG. 5 shows the asperity contact pressure along the piston ring profile for the different cases.

Engine tests were made with oil piston rings according to the invention with different plateau sizes, and the piston ring radial wear was measured. The variants with larger plateau size presented lower wear. To compare experimental and simulated results numerically, the values were normalized by the respective results obtained for the 0.07 mm plateau size (see FIG. 6).

REFERENCES

[1]—Mierbach, A., et al., "Heat Flow Through Piston Rings And Its Influence On Shape", 1983, SAE paper 831283.
[2]—Ma, J. et al., "The Piston Ring Shape And Its Effects On Engine Performance", 1996, SAE paper 960052.
[3]—Hitosugi et al., JSAE 20005455.
[4]—Tomanik, E. Nigro, F.—"Piston Ring Pack and Cylinder Wear Modelling", 2001, paper SAE 2001-01-0572
[5]—Tomanik, Ferrarese—ASME-ICE Fall Technical Conference September 2002—New Orleans

The invention claimed is:

1. A piston ring (10) for an internal combustion engine, comprising a ring-shaped body (11) having a ring joint (13) formed by butt ends (14a, 14b), said ring-shaped body (11) further having a ring contact face (12) along its perimeter, for contacting a cylinder wall in operation, wherein said ring contact face (12) has a barrel-shaped profile, said barrel-shaped profile having in any of its cross-sections an area of maximum curvature, whose radius of curvature increases in the direction of the butt ends (14a, 14b), such that the piston ring (10) has a larger contact area in the regions of the butt ends 14a, 14b than in other regions of the piston ring, for contacting a cylinder wall in operation.

2. The piston ring according to claim 1, wherein the increase of the radius of curvature is made gradually in the direction of the butt ends (14a, 14b).

3. The piston ring according to claim 1, wherein the increase of the radius of curvature commences at an annular 90° position of the ring contact face, with regard to the ring joint (13), extending to each butt end (14a, 14b).

4. The piston ring according to claim 3, wherein the increase of the curvature radius commences at an annular 30° position of the ring contact face, with regard to the ring joint (13), extending to each butt end (14a, 14b).

5. The piston ring according to claim 1, wherein the barrel-shaped profile of the ring contact face (12) is manufactured by a grinding or lapping process.

* * * * *